United States Patent [19]

Loebert

[11] Patent Number: 4,736,912

[45] Date of Patent: Apr. 12, 1988

[54] APPARATUS FOR REDUCING TURBULENT DRAG

[75] Inventor: Gerhard Loebert, Baldham, Fed. Rep. of Germany

[73] Assignee: Messerschmitt-Boelkow-Blohm GmbH, Munich, Fed. Rep. of Germany

[21] Appl. No.: 86,185

[22] Filed: Aug. 12, 1987

Related U.S. Application Data

[63] Continuation of Ser. No. 872,522, Jun. 10, 1986, abandoned.

[30] Foreign Application Priority Data

Jun. 27, 1985 [DE] Fed. Rep. of Germany ....... 3522943

[51] Int. Cl.[4] ................................................. B64C 1/38
[52] U.S. Cl. .................................... 244/130; 244/200; 114/67 R
[58] Field of Search ...................... 244/130, 199, 200; 114/67 R, 68, 69, 290

[56] References Cited

U.S. PATENT DOCUMENTS

| D. 160,027 | 9/1950 | Smith | 114/290 |
| 1,303,544 | 5/1919 | Dorr | 244/200 |
| 2,800,291 | 7/1957 | Stephens | 244/130 |
| 2,899,150 | 8/1959 | Ellis, Jr. | 244/130 |
| 3,137,261 | 6/1964 | Noe | 114/290 |
| 4,650,138 | 3/1987 | Grose | 244/130 |

FOREIGN PATENT DOCUMENTS

| 845900 | 8/1952 | Fed. Rep. of Germany | 244/200 |
| 656859 | 5/1929 | France | 244/200 |

Primary Examiner—Joseph F. Peters, Jr.
Assistant Examiner—Rodney Corl
Attorney, Agent, or Firm—W. G. Fasse; D. H. Kane, Jr.

[57] ABSTRACT

The turbulent drag is reduced on the surface of a body moving through a fluid by providing longitudinal channels in the surface, for example of an aircraft wing, which channels extend in parallel to the flow direction and which channels are interconnected with the boundary layer by a longitudinal gap communicating the channel with the boundary layer.

6 Claims, 6 Drawing Sheets

APPARATUS FOR REDUCING TURBULENT DRAG

This application is a continuation, of application Ser. No.: 872,522, filed June 10, 1986 now abandoned.

FIELD OF THE INVENTION

The invention relates to an apparatus for reducing turbulent drag, especially in aircraft, spacecraft, and watercraft.

DESCRIPTION OF THE PRIOR ART

Reducing turbulent drag is especially important because more than half of the fuel used, for example in air traffic, is used up for overcoming the turbulent drag component.

Although the Reynolds-number, the Mach-number, and the wall temperature have an influence on the turbulent drag, the characteristics of the body surface primarily determine the size of the turbulent drag. Where a smooth surface is involved, the turbulent boundary layer can be divided into a laminar inner layer close to the wall and into an adjoining thicker tubulent layer. The inner layer has the thickness $\delta_u$. The mean flow speed $V(y)$ and the shearing stress $\tau(y)$ are steady or constant at the transition between the inner layer and the turbulent outer layer. The shearing stress $\tau(y)$ is constant within the laminar inner layer. Thus, the speed V rises linearly from zero on the wall to the transition value $V(\delta_u)=V*$. The speed is zero at the wall due to the no-slip condition. For a Reynolds-number of $50 \cdot 10^6$ this transition speed $V*$ corresponds to 34% of the flow speed occurring at the outer edge of the boundary layer.

The two layer model of the turbulent boundary layer shows that the turbulent boundary layer slides, so to speak, on the laminar inner layer. The speed $V*$ can be considered to be a final speed of the fluid balls or bubbles of the turbulent layer closest to the wall and relative to the wall which is considered to be stationary. Thus, it is to be expected that the shearing stress within the turbulent friction layer is influenced or determined by the speed difference $(V_\infty - V*)$. If it should be possible to modify the surface of the body for increasing the transitional speed $V*$ also referred to as the slip speed, then it would be possible to reduce the turbulent drag.

One possibility of reducing the turbulent drag is seen in lowering the viscosity of the laminar inner layer by a surface transpiration of a suitable low friction fluid. The requirement for a steady or constant shearing stress curve or characteristic then leads to a higher slip speed $V*$ and thus to a smaller shearing stress in the entire boundary layer. Tests performed in a hydrodynamic tank have shown that the turbulent drag can be reduced up to 80% if air is blown out of the body surface. Air has a viscosity which is 60 times smaller than the viscosity of water, please see in this connection the article "The Effects of Porous Material on Microbubble Skin Friction Reduction" by Madavan, Deutsch, and Merkle in AIAA Paper No. 84-0348 (1984).

A further possibility of reducing the drag is seen in increasing the effective thickness $\delta_u$ of the laminar inner layer because such an increase also causes an increase in the slip speed $V*$. Such thickening of the intermediate layer can be achieved with the aid of longitudinal grooves having a V-cross-section and dimensions in the order of magnitude corresponding to that of the thickness $\delta_u$ of the inner layer. Such grooves or "riblets" have resulted in a drag reduction of 8%, please see in this connection the article "Optimization and Application of Riblets for Turbulent Drag Reduction" by Walsh, Lindemann in AIAA, Paper No. 84-0347 (1984).

OBJECTS OF THE INVENTION

In view of the foregoing it is the aim of the invention to achieve the following objects singly or in combination:

to generate a "slip" at least in a partial area of the surface in the flow to thereby improve the flow mechanics of the no-slip conditions;

to reduce especially the turbulent drag on the surface or a body in a flow for achieving a reduction in the fuel consumption of any type of craft moving through a fluid medium; and to provide a new wing surface construction, especially for an aircraft, having a reduced turbulent drag.

SUMMARY OF THE INVENTION

According to the invention the turbulent drag in a body moving through a fluid flow is reduced by a plurality of channels in the surface of the body, whereby these channels extend in parallel to the fluid flow direction and wherein the channels are interconnected with the boundary layer through a longitudinal gap also extending in parallel to the flow direction. These features result in the turbulent drag reduction as will be explained in more detail below.

BRIEF DESCRIPTION OF THE DRAWINGS

In order that the invention may be clearly understood, it will now be described, by way of example, with reference to the accompanying drawings, wherein:

FIG. 9b shows a top view onto the sectional view of FIG. 9a.

DETAILED DESCRIPTION OF PREFERRED EXAMPLE EMBODIMENTS AND OF THE BEST MODE OF THE INVENTION

The no-slip condition of flow mechanics says that the flow speed and the wall speed are identical to each other at the interface or transition between the flowing medium and the wall. Due to the no-slip condition and due to the viscosity each body moving through a stationary medium entrains a portion of the medium alongside the body and behind the body, whereby the body is subject to a braking action. The drag of aircraft and watercraft is thus a direct effect of the flow mechanical no-slip condition.

The following disclosure is based on the assumption that the laminar flow in a closed channel has a substantially higher stability than the laminar inner layer of the turbulent boundary layer. Thus, the Reynolds-number produced with the transition speed V* and the thickness $\delta_u$ of the laminar inner layer is about 135 while the critical Reynolds-number Re produced with the diameter and with the maximum flow speed in a pipe is 4000. This means that in a closed channel a substantially thicker laminar flow can be maintained than is the case for a laminar inner layer which is stabilized only on one surface at the same maximum speed.

Figure 1A:
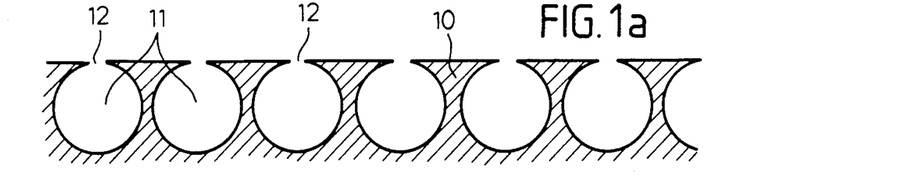
FIG. 1a is a cross-sectional view through the top surface of a body intended for movement through a fluid flow such as an aircraft wing, whereby the sectional plane extends perpendicularly to the flow direction and the channels have a circular cross-section.
Figure 1B:
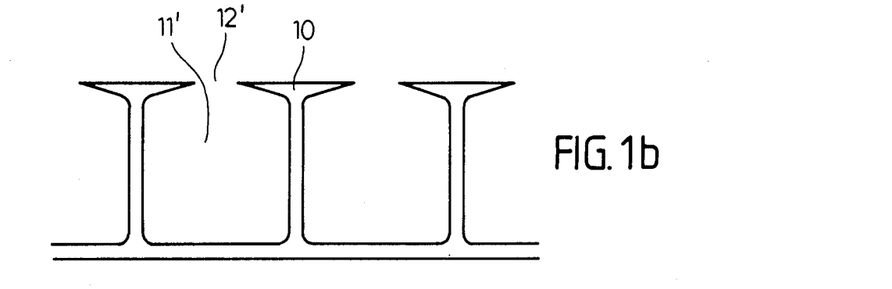
FIG. 1b is a view similar to that of FIG. 1a, however, the channels in FIG. 1b have a substantially square cross-section with pointed gap edges.
Figure 1C:
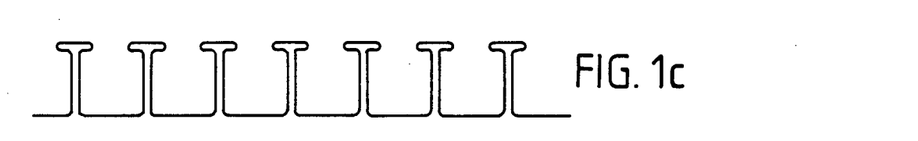
FIG. 1c is a further embodiment with a square channel cross-section, but rounded gap edges.

Thus, if a plurality of closely spaced channels are arranged to extend in parallel to one another and in parallel to the flow direction directly within a body zone the surface of which is in contact with the flow, and if each of these channels is in communication with the outer flow through a respective longitudinal gap as shown, according to the invention, in FIGS. 1a, 1b, and 1c, the thickness of the laminar shearing layer is effectively increased by the channel dimension and results in an increase of the transition or slip speed V* and thus in a reduction of the shearing stress within the boundary layer, the dimensions of these channels are so selected that a laminar flow in the channels is just about still assured. The effectiveness of this drag reducing feature depends very much on the channel dimension up to which a laminar channel flow can be maintained in these channels.

The following letters and symbols are used in the present disclosure:

$a_n$ coefficient of the series for u (y, z) (see Equation 8);
b width of the square channel, or diameter of the circular channel, channel dimension;
d exponent in Equation (4), a constant theoretical value of 1.685;
F factor in Equation 13;
Re $\rho V_\infty$ x/μ, local Reynolds-number;
$Re_K$ $\rho u_{center}$ b/μ, Reynolds-number of the channel flow (channel Reynolds-number);
s gap width;
u, v, w velocity or speed components in the x-, y-, and z-directions of a rectangular coordinate system;
$u_{center}$ flow speed in the gap center;
V flow speed;
V* transition flow speed at the outer surface or edge of the laminar inner flow layer
$V_\infty$ speed at the outer edge or surface of the boundary layer;
$W_R$ drag;
x, y, z rectangular coordinates of a coordinate system in which the x-axis coincides with the centerline of the gap. The y-axis extends out of the gap and perpendicularly to the gap surface or plane. The z-axis extends in the gap plane. The turbulent boundary layer begins at x=0.;
a=0.4033 (Re/10⁷)⁻⁰·¹ (Re—Reynolds-number);
β=V*/$V_\infty$ at the tangent point of contact according to Equation 11.
$\delta_u$=11,635 μ/$\sqrt{\rho \tau_w}$, thickness of the laminar inner layer;
μ fluid viscosity;
ρ fluid density;
τ shearing stress in the boundary layer;
τ* shearing stress at the inner surface or edge of the turbulent layer;
$\tau_{wo}$ shearing stress at a smooth surface wall.

Figure 2A:
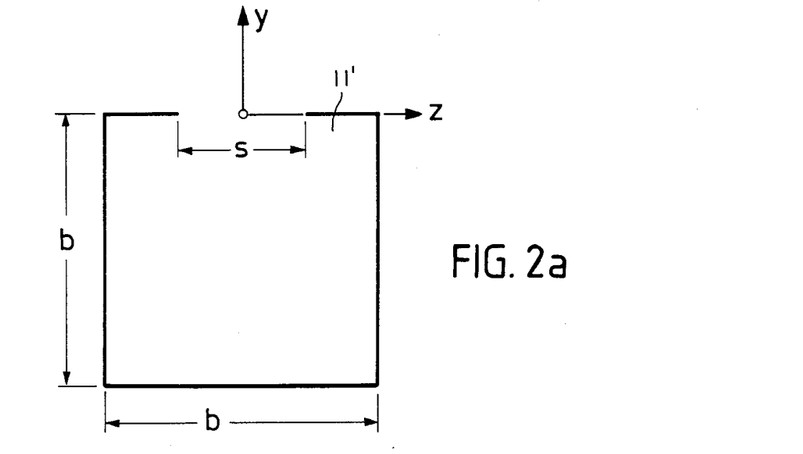
FIG. 2a illustrates schematically the dimensions of a square channel and of the gap width as well as the location of a rectangular coordinate system used in explaining the present invention.
Figure 2B:
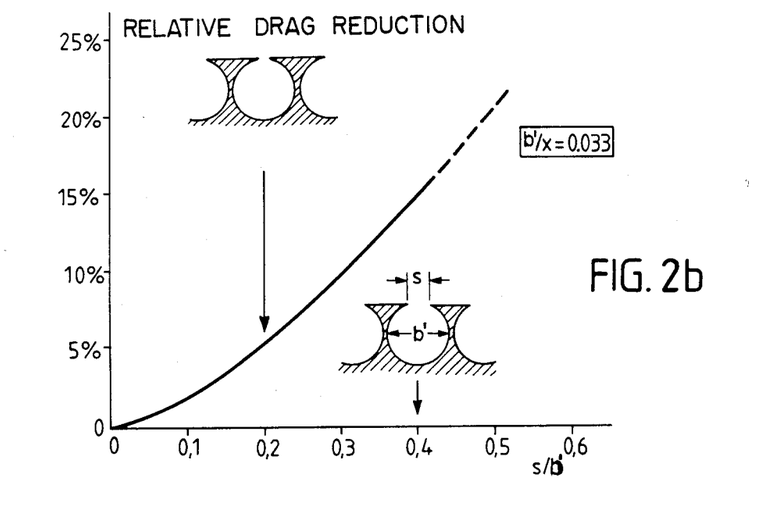
FIG. 2b illustrates the relative drag reduction as a function of the relative gap width defined as the ratio of the gap width to the channel diameter or channel width.
Figure 2C:
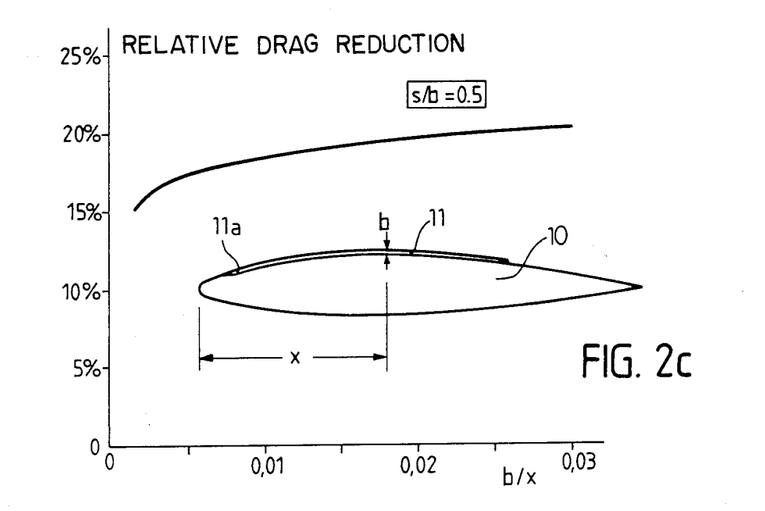
FIG. 2c illustrates the relative drag reduction as a function of the relative channel size defined as the ratio of the channel diameter to a distance X from the leading edge of the body such as an aircraft wing with the relative gap width equal to 0.5 as a constant parameter.

The following analysis of the flow mechanical problems is limited to the noncompressible, turbulent boundary layer without any pressure gradient. First, the laminar flow in a slide channel having a square cross-section with a width b is examined. Such a channel 11' shown in FIG. 1b communicates with the boundary layer through a gap 12' having a gap width s. The respective coordinate system is shown in FIG. 2a. It is assumed that the flow quantities are constant in the x-direction so that the motion or dynamic equations for the cross-flow are of no consequence. Under these assumptions one obtains the following determination equations for the static problem:

Local mass conservation $$\frac{\partial v}{\partial y} + \frac{\partial w}{\partial z} = 0 \tag{1}$$

Conservation of the x-impulse $$v\frac{\partial u}{\partial y} + w\frac{\partial u}{\partial z} = \frac{\mu}{\rho}\left(\frac{\partial^2 u}{\partial y^2} + \frac{\partial^2 u}{\partial z^2}\right) \tag{2}$$

The speed components u, v, and w are subject to the following limit or boundary conditions:

On the channel surface $$u=v=w=0 \tag{3a}$$

On the control or reference surface defined by the gap s $$v=0 \tag{3b}$$

$$u(z)=V*(z) \tag{3c}$$

$$\mu \frac{\partial u}{\partial y}(z) = \tau_*(z) \quad (3d)$$

whereby $V_*$ and $\tau_*$ represent the slip speed and the shearing stress at the inner edge or surface of the turbulent layer. The limit or boundary conditions (3c) and (3d) assure the constant or steady merging of the flow in the channel into the turbulent layer.

For solving the present problem it is necessary to establish the relationship between the shearing stress $\tau_*$ at the inner edge or surface of the turbulent surface layer and the slip or transition speed $V_*$ at that layer. For establishing this relationship it is assumed that $\tau_*$ is determined exclusively by the speed difference $(V_\infty - V_*)$ and that the following relationship exists between the two values $V_*$ and $\tau_*$.

$$\tau_* = \left[ \frac{1 - V_*/V_\infty}{1 - 0.4033(Re/10^7)^{-0.1}} \right]^d \tau_{w_0}(Re) \quad (4)$$

In Equation (4) the expression $\tau_{w_0}$ represents the wall shearing stress for the reference wall which is considered to have a smooth surface. The second term in the denominator represents the speed referenced to $V_\infty$ at the inner edge or surface of the turbulent layer with regard to the smooth surface case.

The exponent "d" has been taken from the theory of an incompressible turbulent boundary layer. According to this theory the wall shearing stress rises proportionally to $$(V - V_*)^{1.685}$$

throughout a large range of Reynolds-numbers. Thus, d is = 1.685.

Based on the limit condition (3a) and further based on the assumption that cross-accelerations are negligible, it follows $$v(y, z) = w(y, z) = 0 \quad (5)$$

Thus, Equation (2) can be rewritten as follows $$\frac{\partial^2 u}{\partial y^2} + \frac{\partial^2 u}{\partial z^2} = 0 \quad (6)$$

Equation (6) is identical to the static or stationary two-dimensional heat conduction equation, whereby in the heat conduction equation "u" would be replaced by the temperature T. It is known from the heat conduction theory that each function of the form $$u \sim \sin \frac{n\pi(z + b/2)}{b} \sinh \frac{(b + y)n\pi}{b} \quad (7)$$

$n = 1, 2, 3 \ldots \infty$ satisfies Equation (6) and the condition (3a). Based on these facts the solution to the present problem is as follows.

$$u(y, z) = \sum_{n=1}^{\infty} a_n \sin \frac{n\pi(z + b/2)}{b} \sinh \frac{(b + y)n\pi}{b} / \sinh(n\pi) \quad (8)$$

whereby the coefficients $a_n$ are to be selected so that $$u(o, z) = \sum_{n=1}^{\infty} a_n \sin \frac{n\pi(z + b/2)}{b} \quad (9)$$

corresponds to the speed distribution on the channel side where $y = 0$ and so that Equation (9) corresponds to $$\mu \frac{\partial u}{\partial y}(o, z) = \sum_{n=1}^{\infty} a_n \frac{\mu n\pi}{b} \sin \frac{n\pi(z + b/2)}{b} / \tanh(n\pi) \quad (10)$$

which represents the shearing stress distribution in the gap. These two distributions are linked through Equation (4).

For solving the present problem a linear relationship between $V_*$ and $\tau_*$ are required. For this purpose the curve 4 is replaced by its tangent in the point $V_*/V_\infty = \beta$. Thus, instead of Equation (4), Equation (11) applies $$\tau_*(V_*) = \tau_{w_0} \frac{(1-\beta)^{d-1}}{(1-a)^d} \left[ 1 + (d-1)\beta - \frac{d}{V_\infty} V_* \right] \quad (11)$$

whereby $a = 0.4033 (Re/10^7)^{-0.1}$ and wherein $d = 1.685$.

Figure 3:
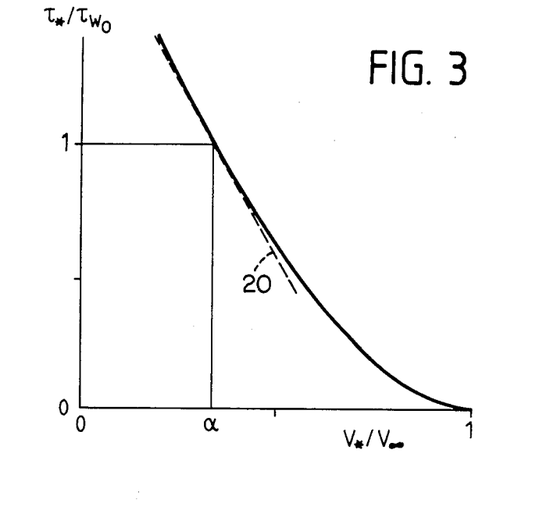
FIG. 3 shows the wall shearing stress as a function of the flow speed at the inner edge or surface of the turbulent layer.

FIG. 3 compares the linear and the nonlinear function of $\tau_*(V_*)$ if $\beta = a$.

If one eliminates $V_*$ and $\tau_*$ from Equations (3c), (3d), and (11) one obtains the modified limit condition $$u(z) + \frac{(1-a)^d}{(1-\beta)^{d-1}} \frac{V_\infty}{\tau_{w_0} d} \mu \frac{\partial u}{\partial y}(z) = \frac{1 + (d-1)\beta}{d} V_\infty \quad (12)$$

For solving the Equations (3), (8), and (11) for a given value of $Re_K$, the channel upper side $y = 0$ is divided into N partial sections of equal length. The centers of these partial sections are designated as $z_i$, whereby $i = 1, 2 \ldots N$. By using Equations (9) and (10) the limit condition (12) for the centers located in the gap and the limit condition (3a) for the remaining centers $z_i$ are written, whereby the summations occurring in Equations (9) and (10) are limited to the respective first N terms. In this manner we obtain the following linear Equation system for the N unknown coefficients $a_n$.

$$\sum_{j=1}^{N} \sin[j\pi(z_i + b/2)/b][1 + F(1-a)^d \mu j\pi V_\infty / \{(1-\beta)^{d-1} b \tau_{w_0} d \cdot \quad (13)$$

$$\tanh(j\pi)\}]a_j = F[1 + (d-1)\beta]V_\infty/d$$

$i = 1, 2 \ldots N$ $F = 1$ fur $|z_i| < s/2$ $F = 0$ fur $|z_i| > s/2$

After solving this Equation system for the special condition that $\beta = a$ the shearing stress for each of the centers $z_i$ is calculated with Equation (10). The speed $u_c$ occurring at the center of the gap is calculated with Equation (8). Thereafter, the channel width "b" is corrected in accordance with Equation (14)

$$b = \mu Re_K/(\rho \cdot u_c) \quad (14)$$

The calculation is repeated until $u_c$ does not change anymore. Beginning with the second iteration step $\beta$ is replaced by the mean value of the speed $u(o, z)$ occurring in the gap, whereby this mean value is referenced to $V_\infty$. Thus, Equation (4) has been approximated as precisely as possible by the straight line 20 shown in FIG. 3.

In case of a symmetric gap arrangement, the nonsymmetric or antisymmetric terms in the progression of Equation (8) are not used and $z_i$ remains limited the range $z > 0$.

The total drag of the present surface configuration is obtained by integrating the shearing stress in the plane $y = 0$. This is so, because upon pressure equalization the force causing drag at the channel walls corresponds with the shearing force or stress effective in the gap.

It can be shown that the method according to the invention provides the wall shearing stress $\tau_{wo}$ of the wall having a smooth surface if the rectangular channel is open on one side and has a large width, and provided $Re_K = 135$.

Figure 4:
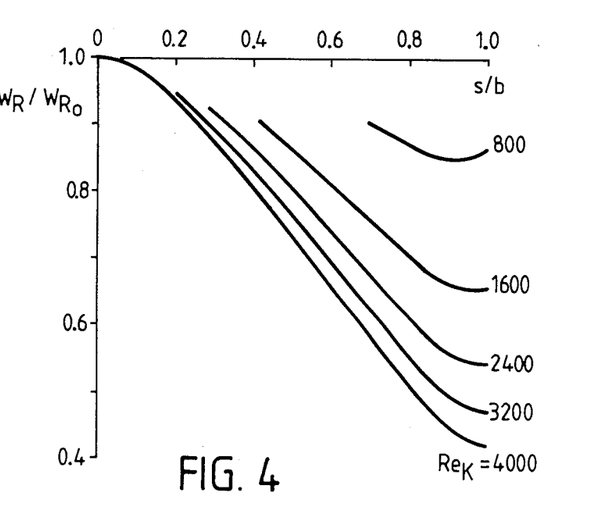
FIG. 4 shows curves illustrating the relative drag of the surfaces according to the invention as a function of the relative gap width for several values of the channel Reynolds-number as parameters, whereby the Reynolds-number $Re-50 \cdot 10^6$ is the drag of the smooth surface serving as a reference value or reference case.

FIG. 4 shows the frictional drag as a function of the surface configuration according to the invention having a gap width ratio of s/b for several values of the channel Reynolds-number $Re_K$ and for the Reynolds-number $Re = 50 \cdot 10^6$. Here again, the reference value was the frictional drag of a hydraulically smooth wall having the same Reynolds-number. The results are valid for the limit case of a channel wall thickness approximating 0. as shown, the drag decreases more than in a linear manner as the gap width ratio s/b increases. This is so because on the one hand the boundary layer zone which benefits from the thick laminar inner layer keeps increasing and because on the other hand, the mean slip speed or velocity in the gap also increases with an increasing s/b ratio. A reversal point occurs in the upper range of the s/b ratio because the braking effect emanating from the channels side walls increases in this upper range.

The effectiveness of the channels 11,11' extending in parallel to the flow along the surfaces 10, for example forming an aircraft wing, is the smaller the smaller the channel Reynolds-number is. It may be expected that the stability of the laminar channel flow that is the critical Reynolds-number is reduced with an increasing gap width ratio s/b. This reduction applies especially to the upper range of the gap width ratio s/b. Thus, the actually achievable drag curve will increase again in the upper range of the s/b ratio. When the s/b ratio reaches 1 the drag ratio may be expected to reach the value 0.9 which has actually been measured for fine or small longitudinal grooves also referred to as "riblets" with reference to the wall portions separating adjacent channels. The most effective gap width ratio and the corresponding critical channel Reynolds-number can only be ascertained by an experiment.

Figure 5:
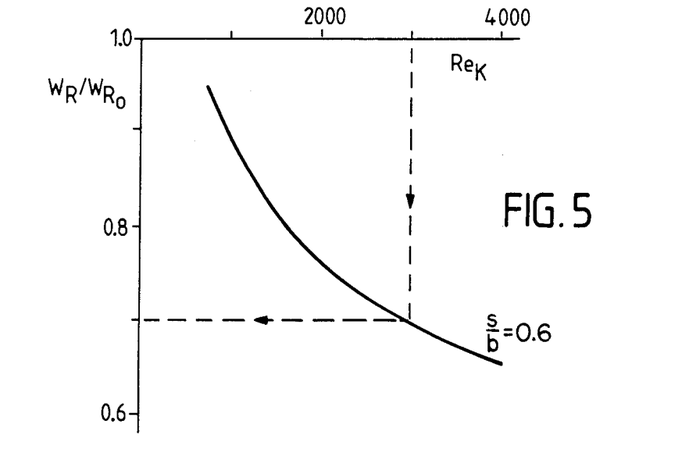
FIG. 5 illustrates the influence of the channel Reynolds-number on the relative drag where the relative gap width is a constant parameter equal to 0.6.

FIG. 5 shows the relative frictional drag for the gap width ratio s/b = 0.6 as a function of the channel Reynolds-number $Re_K$. If the laminar channel flow would remain stable up to a Reynolds-number of 3200, it would be possible to reduce the turbulent drag with this channel configuration by 31% as compared to a surface without such drag reducing channels as disclosed herein. If the stability limit appears at a channel Reynolds-number of $Re_K = 1600$ then the reduction of the turbulent drag corresponds to 19%.

Figure 6:
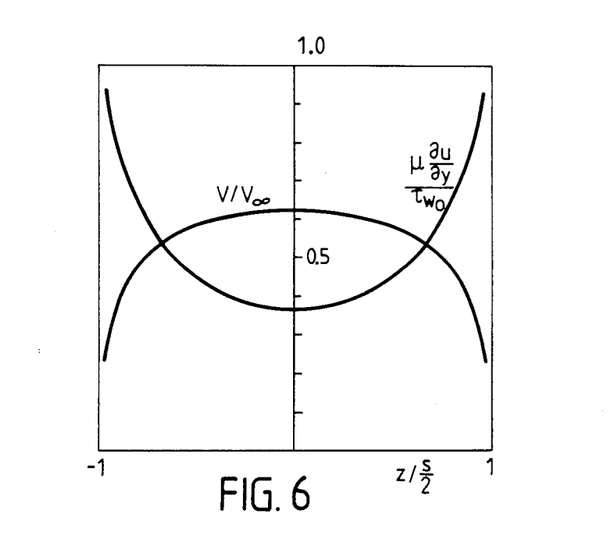
FIG. 6 illustrates the speed and shearing stress distribution in the gap area for the following parameters relative gap width s/b=0.5; channel Reynolds-number $Re_K$=3200, Reynolds-number=50·10⁶.

FIG. 6 shows the distribution of the shearing stress and of the flow speed in the area of the gap 12, 12' for a gap width ratio s/b = 0.5 and for a channel Reynolds-number = 3200. As shown, the no-slip condition V causes a reduction to the value 0 along the gap edges. On the other hand, $\mu \partial u/\partial y$, increases sharply at the edges or lips of the upper channel wall.

Figure 7:
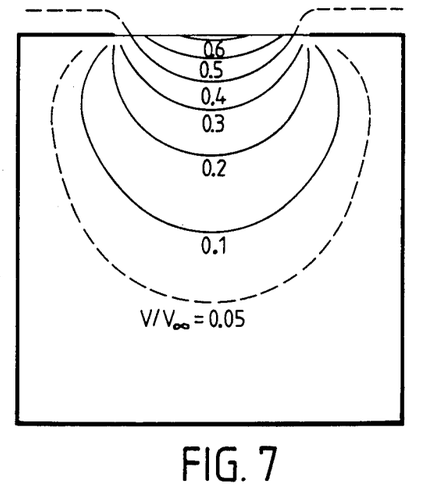
FIG. 7 illustrates a group of isotach curves of the laminar flow for the same parameters as in FIG. 6.

FIG. 7 illustrates the group of isotach curves of the channel flow for the same flow condition as in FIG. 6. The isotach curve $V/V_\infty = 0.5$ has been extended by a dashed line outside of the channel gap and it provides a picture of the thickness of the laminar inner layer under the reference conditions mentioned above.

Figure 8:
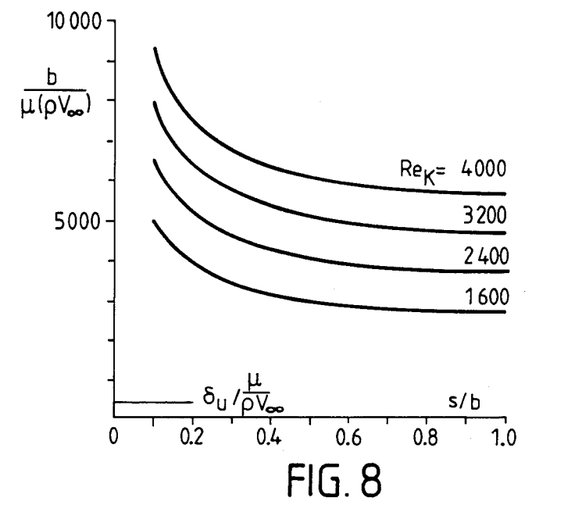
FIG. 8 illustrates the channel width as a function of the relative gap width for several channel Reynolds-numbers as parameters.

FIG. 8 shows the dependence of the channel width b, referenced to $\mu(\rho V_\infty)$, from the gap width ratio s/b, whereby the channel Reynolds-number is used as a parameter. For a Mach-number of 0.8 and a flight altitude of 11 kilometers, the reference length is 0.163 microns. As shown, the width b of the channels 11, 11' depends on the critical channel Reynolds-number and on the gap width ratio, and is within the range of 0.5 to 1.0 mm. In FIG. 8 the thickness of the laminar inner layer is shown in the lower left-hand corner for the reference case and for a Reynolds-number of $50 \cdot 10^6$.

Summarizing the following results may be stated.

As shown in FIG. 5, in which a gap width ratio of 0.6 is the parameter, the turbulent drag can be reduced by 30% with the surface configuration according to the invention if the channel flow, as in a closed pipe, remains laminar up to a channel Reynolds-number of 3000. The further reduction in the drag as shown in FIG. 4, may, however, not be realizable, because the critical Reynolds-number is likely to become smaller in the upper range of the gap width ratio s/b.

It is known from hydraulics, that all channel cross-sectional shapes are equal to each other, provided that the comparing takes place on the basis of the effective channel diameter, whereby the cross-sectional area is multiplied by 4 and divided by the circumference. Therefore, the channel 11 of circular cross-section shown in FIG. 1a is the equivalent of the channel 11' of substantially square cross-section shown in FIG. 1b provided that the width "b" of the square cross-section is the same as the diameter of the circular cross-section. Accordingly, the formation of the channels can be as illustrated in present FIGS. 1a, 1b, and 1c or any equivalent cross-sectional shapes without any loss in the effectiveness with regard to the turbulent drag reduction.

It should be mentioned, that the above described surface configurations are not usable in zones where the pressure increases substantially, for example, in the trailing part of an aircraft wing 10, whereby the trailing part corresponds to about 30 to 40% of the aircraft wing width in the flow direction. The present features are also not suitable for use on tail units or in the rear portion of an aircraft body. In these areas the channel flow is not capable to follow the pressure increase enforced by the outer flow. However, the contribution to the turbulent drag of these areas is substantially smaller than their surface proportion relative to the entire aircraft. Therefore, this limitation is of minor consequence.

Figure 9A:
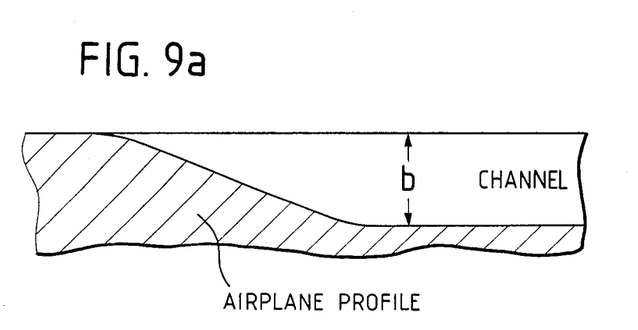
FIG. 9a is a sectional view through a portion of a wall surface zone of a wall forming part of an aircraft.
Figure 9B:
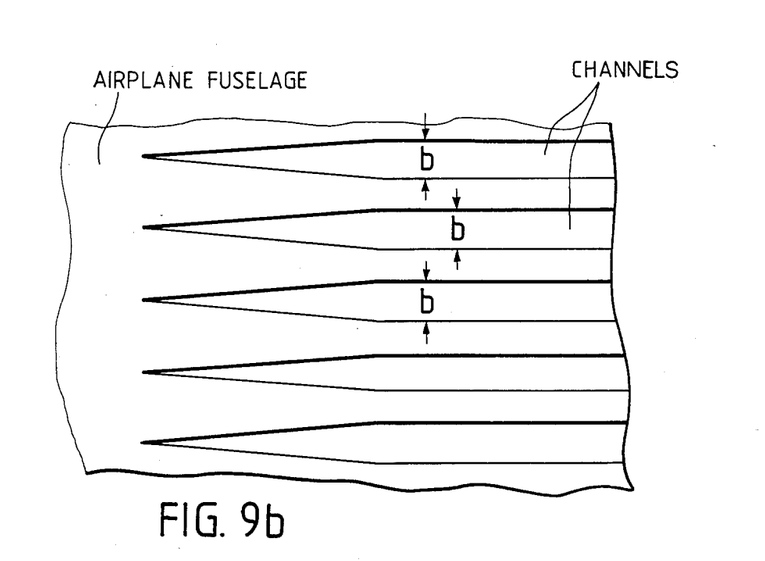

FIGS. 9a and 9b show a sectional view and a top view respectively, of an aircraft wall portion, e.g., a wing wall, wherein a surface zone with channels therein merges gradually into a surface zone without channels, whereby a narrow channel width merges gradually into a wider constant channel width.

Although the invention has been described with reference to specific example embodiments, it will be appreciated, that it is intended to cover all modifications and equivalents within the scope of the appended claims.

The channels can for example be made by attaching extruded plastic foils to the aircraft or watercraft surface.

What I claim is:

1. An apparatus for reducing turbulent drag caused on a surface of a body by relative movement between said body and a fluid, said movement defining a given movement direction, comprising a surface zone in said body adjacent to said body surface in direct contact with said fluid, a plurality of longitudinal channels inside said surface zone, said channels extending in parallel to each other and in parallel to said given movement direction, each channel comprising a longitudinal gap in said body surface communicating the respective channel with a boundary layer of said fluid on said body surface, said channels having an internal width (b, b') which is within the range of about 0.5 to 10 mm to be sufficiently small for assuring a laminar pipe flow inside said longitudinal channels, said longitudinal gaps having a width (s) which has a determined ratio to said sufficiently small internal channel width (b, b'), such that said ratio is smaller than or equal to 1.

2. The apparatus of claim 1, wherein said longitudinal channels have a circular cross-section.

3. The apparatus of claim 1, wherein said longitudinal channels have a substantially square cross-section.

4. The apparatus of claim 1, wherein said channels have a given width and are closely spaced from each other so that a partition wall between neighboring channels has a thickness substantially smaller than said given channel width.

5. The apparatus of claim 1, wherein said channel has a given channel width (b), and wherein said longitudinal gap has a gap width (s), said channel width and said gap width being so dimensioned that the ratio of s to b is within a determined range of about 0.1 to 1.0.

6. The apparatus of claim 1, wherein said longitudinal channels have ends which merge gradually into said body surface in said movement direction so that a transition is formed between a body surface portion without said longitudinal channels and said surface zone having said longitudinal channels, said longitudinal channels having a narrow channel width where said transition begins, said narrow channel width widening toward a constant channel width.

* * * * *

UNITED STATES PATENT AND TRADEMARK OFFICE
CERTIFICATE OF CORRECTION

PATENT NO. : 4,736,912
DATED : April 12, 1988
INVENTOR(S) : Gerhard Loebert

It is certified that error appears in the above-identified patent and that said Letters Patent is hereby corrected as shown below:

Claim 1, (Column 9, line 20) replace "10 mm" to --1.0 mm--.

Signed and Sealed this

Ninth Day of August, 1988

Attest:

DONALD J. QUIGG

Attesting Officer

Commissioner of Patents and Trademarks